(12) United States Patent
Chang et al.

(10) Patent No.: US 9,776,931 B2
(45) Date of Patent: Oct. 3, 2017

(54) FACILITY SECONDARY $NO_3^-$ SALINIZED SOIL MODIFIER, PREPARATION METHOD AND MODIFICATION METHOD

(71) Applicant: Hohai University, Nanjing (CN)

(72) Inventors: Tingting Chang, Nanjing (CN); Xiaohou Shao, Nanjing (CN); Huilian Xu, Nagano (JP); Weina Wang, Nanjing (CN); Lihua Chen, Nanjing (CN); Xinyu Mao, Nanjing (CN); Chunfang Wang, Nanjing (CN)

(73) Assignee: Hohai University, Nanjing (CN)

( * ) Notice: Subject to any disclaimer, the term of this patent is extended or adjusted under 35 U.S.C. 154(b) by 0 days.

(21) Appl. No.: 14/442,724

(22) PCT Filed: Jun. 19, 2014

(86) PCT No.: PCT/CN2014/080323
§ 371 (c)(1),
(2) Date: May 14, 2015

(87) PCT Pub. No.: WO2015/184658
PCT Pub. Date: Dec. 10, 2015

(65) Prior Publication Data
US 2017/0073279 A1  Mar. 16, 2017

(30) Foreign Application Priority Data
Jun. 3, 2014  (CN) .......................... 2014 1 0242557

(51) Int. Cl.
| | |
|---|---|
| *C05F 11/08* | (2006.01) |
| *C05G 3/04* | (2006.01) |
| *C09K 17/00* | (2006.01) |
| *A01C 21/00* | (2006.01) |
| *A01G 1/00* | (2006.01) |
| *C05B 17/00* | (2006.01) |
| *C09K 17/14* | (2006.01) |

(52) U.S. Cl.
CPC .............. *C05G 3/04* (2013.01); *A01C 21/005* (2013.01); *A01G 1/001* (2013.01); *C05B 17/00* (2013.01); *C05F 11/08* (2013.01); *C09K 17/00* (2013.01); *C09K 17/14* (2013.01)

(58) Field of Classification Search
CPC ...................................... C05F 11/08
See application file for complete search history.

(56) References Cited

U.S. PATENT DOCUMENTS

| 6,649,397 B1 * | 11/2003 | Nakamura | A01N 63/04 435/243 |
| 2012/0255334 A1 * | 10/2012 | Gans | C05F 1/002 71/6 |
| 2013/0291607 A1 * | 11/2013 | Mansour | C05D 9/00 71/6 |
| 2013/0344558 A1 * | 12/2013 | Green | C05F 5/00 435/170 |

FOREIGN PATENT DOCUMENTS

| CN | 100999667 A | 7/2007 |
| CN | 101200640 A | 6/2008 |
| CN | 101941854 A | 1/2011 |
| CN | 102199062 A | 9/2011 |
| CN | 102498778 A | 6/2012 |
| CN | 102503611 A | 6/2012 |
| CN | 102776124 A | 11/2012 |
| CN | 103274774 A | 9/2013 |

OTHER PUBLICATIONS

Qinrui Zhao et al: "The application and prospect of effective microbial technology on agriculture", Jiangsu Agricultural Sciences, Aug. 31, 2012, pp. 6-7,vol. 40, No. 8.
Shanshan Xu et al: "The application and prospect of EM technology in the aspect of soil improvement", Proceedings of cultivated land quality construction in jiangsu, Dec. 31, 2008.

\* cited by examiner

*Primary Examiner* — Wayne Langel
(74) *Attorney, Agent, or Firm* — Muncy, Geissler, Olds & Lowe, P.C.

(57) ABSTRACT

A facility secondary $NO_3^-$ salinized soil modifier and a modification method are disclosed. The present invention involves the preparation processes of two biological soil modifiers A and B and application methods thereof, which are specifically described as follows: (1) soil modifier A: solid, obtained by microbial fermentation with straw powder and rice bran and the like as raw materials, C/N between 30-50, applied by uniformly mixing at 1-1.4‰ by mass with facility ploughing soil, co-culturing at 35-50° C. for 5-7 days, and then returning to fields; and (2) soil modifier B: liquid, subjected to salt tolerance acclimation to have effective microbial populations, and used in the crop growth period. Based on the microbial techniques, the present invention can improve soil structureness, enhance microbial activity and promote biological immobilization on inorganic nitrogen in soils, significantly increasing the facility cultivation crop yield, and improving the product quality.

6 Claims, No Drawings

FACILITY SECONDARY $NO_3^-$ SALINIZED SOIL MODIFIER, PREPARATION METHOD AND MODIFICATION METHOD

TECHNICAL FIELD

The present invention relates to the field of soil modification, and in particular, to a facility secondary $NO_3^-$ salinized soil modifier, a preparation method and a modification method.

BACKGROUND ART

In China, fertilizer input is an important link in facility agriculture production, and has common features of excessive application amount, application of raw organic fertilizers, and uncoordinated N—P—K ratio. Because fertilizer input within a short time has significant yield increasing effect, in order to pursue high output, excessive fertilizers are usually applied, which greatly exceeds actual absorption by crops. As a consequence, residual fertilizers in the soils become a major source of salt ions, which results in the problems of year-to-year exacerbated facility soil secondary salinization, soil microbial flora imbalance, and soil compaction, causes gradually exacerbated environmental quality conditions of facility vegetable soils, and poses a threat to sustainable production capacity of soils and sustainable development of facility vegetable industry.

The salt ions of facility secondary salinized soils comprises four cations $K^+$, $Ca^{2+}$, $Na^+$, $Mg^{2+}$ and four anions $NO_3^-$, $SO_4^{2-}$, $Cl^-$, $HCO_3^-$. Research has shown that $NO_3^-$ in facility soils has the highest content, and proportions of other ions vary with the type of chemical fertilizers and organic fertilizers applied.

The uncoordinated salt ion ratio in facility soils affects the ion balance in crops and hampers the nutrient uptake by crops, thereby affecting the growth and decreasing the yield. The high concentration of salt components inhibits soil microbial activity and affects the effectuation process of soil nutrients, thereby indirectly affecting nutrient supply of soils for crops. The high $NO_3^-$ content in soils further affects the contents of nitrates and nitrites in crops, thereby reducing the product quality. Nitrate nitrogen partially penetrates into a deep ploughing layer or flows into an underground water, thereby causing water pollution and endangering human health.

Soil microbial growth and propagation require good soil fertility conditions and environmental quality conditions, and the optimum temperature, humidity and nutrients needed are similar to those needed by plants. Therefore, the microbial amount has a close relation with soil fertility and plant growth, can sensitively reflect differences among various soil ecosystems, and thus can used as an important indicator on soil fertility quality. The microbial amount in facility secondary salt salinized soils is significantly reduced, the type and amount of dominant populations are reduced, pathogens such as *Pythium* are substantially enriched, and pests and diseases are seriously increased, indicating worsened both soil fertility and quality.

To sum up, the problems such as salt accumulation in facility soils and microbial flora imbalance have seriously affected sustainable development of facility cultivation.

Conventional methods such as application of gypsum, organic fertilizers as modifier can be used for adjusting soil properties, and measures such as cultivation of salt-tolerant crops and irrigation and drainage can be taken to discharge salts from soils.

Because of quick action, low cost and easy application, gypsum ($CaSO_4$) has become the most commonly used method in modification of facility soils. The common practice is to apply gypsum onto the soil surface and perform conventional cultivation. Eventually, gypsum will be dissolved in soils, and brought into soil water by irrigation or precipitation. Through ion exchange, calcium ions can replace base ions in soils, and finally are discharged with water from soils. However, gypsum ($CaSO_4$) has numerous disadvantages. For example, gypsum itself is a sparingly soluble substance, so that part of the ions dissolved in soils possibly cannot achieve effective ion exchange for deep soils. In addition, that part of the base ions replaced by gypsum ($CaSO_4$) can be rinsed into underlying soils from crop root zones only by irrigation or precipitation, and can be discharged from the soil body only under good drainage conditions. Moreover, gypsum ($CaSO_4$) itself also is a salt, and in case of multiple repeated use, soil salts will be increased while soils are modified.

Application of organic fertilizers can increase the total amount of soil microorganisms, increase the number of dominant populations, enrich the colony diversity, and stabilize the colony structure. When the fertilization structure comprises a low content of organic fertilizers, increase in proportion of organic fertilizers can significantly inhibit soil salt accumulation. However, improper use of organic fertilizers generates multiple base ions, and substantial application of organic fertilizers also causes soil salt accumulation. For example, application of organic fertilizers such as a rapeseed cake fertilizer that have a low C/N ratio will significantly increase the total salt content in the 0-20 cm soil layer.

Research has shown that for more than 3 years of continuous facility cultivation, soil secondary salinization will occur, which results in decreased crop yield and even crop death, as well as complete loss of soil ploughing capacity. In order to effectively solve the problem of soil secondary salinization, microbial techniques can be introduced. Biological soil modifiers can increase the amount of beneficial microbes in soils, improve the soil structure, decrease the soil bulk density, change the physicochemical properties of soils, adjust water, fertilizer, gas, thermal conditions of soils, and finally achieve the soil quality increasing effect.

CN00999667A titled "Facility Vegetable Soil Modifier and Preparation and Use Thereof" has introduced a soil modifier with peat, kieselguhr, microbial agents (*Bacillus subtilis*, Actinomycetes and *Trichoderma*), peanut meal and fly ash as raw materials.

CN101941854A titled "Facility Vegetable Soil Modifier Compatible with $CO_2$ Fertilization and Preparation thereof" has introduced an organic fertilizer obtained by fermenting crop straws with microbial agents (straw decomposing agents and *B. subtilis*).

CN200610130054.5 titled "Biological Soil Additive Formulation for Overcoming Vegetable Continuous Cropping Obstacles" has introduced a biological soil additive formulated from *Trichoderma* as functional microbial agent, Vesicular Arbuscular (VA) mycorrhizas, inorganic nonmetallic mineral zeolites, fermented organic fertilizers, hulls, calcium superphosphate and urea.

CN201110078418.0 titled "Biological Organic Fertilizer for Preventing Soil Salinization in Protected Fields" has introduced a biological organic fertilizer produced from microbial (*Clostridium thermocellum, Bacillus licheniformis, Lactobacillus acidophilus* and *Streptomyces badius*) fermentation lignite, vinegar residue, sawdust (straw), shale.

CN201210225968.5 titled "Greenhouse, Shed Soil Reducing, Disinfecting Composite Microbial Agent and Soil Disinfection Method" has provided a soil disinfection method, which specifically comprises after crops are harvested, spreading crop straws, organic fertilizers and composite microbial agents (Bacteria, actinomycetes, yeasts, molds) at the ground; deep ploughing soil layers to make small high ridges; coving ridge surfaces with plastic membranes, filling with water under the membranes to reach 100% of soil moisture, sealing the membranes, covering with shed plastic films for 20-25 days; and opening the shed plastic films for ventilation and removing the membranes.

Research has shown that salt accumulation in facility secondary salt salinized soils results in too high osmotic pressure of soils, and thus results in microbial cells cannot perform normal metabolic activity because of excessive dehydration. Thus, the microbial agents in the patients described above possibly cannot perform normal activity or even will die after entering the soils.

SUMMARY OF THE INVENTION

An object of the present invention is to provide a facility secondary $NO_3^-$ salinized soil modifier and a soil modification method.

The facility secondary $NO_3^-$ salinized soil modifier comprises a soil modifier A and a soil modifier B. The soil modifier A comprises the following components by weight: 30-50 parts of straw powder, 10-40 parts of rice bran, 5-20 parts of rapeseed cake, and also an EM stock solution and red sugar. The weights of the EM stock solution and red sugar both are 1.2-4.5‰ of the total weight of straw powder, rice bran and rapeseed cake. The biological soil modifier B is obtained by acclimation of the EM stock solution by gradually increasing the salt solution concentration, with more than $10^7$ cfu/ml of seeds being obtained.

A method for preparing the facility secondary $NO_3^-$ salinized soil modifier is provided. The preparation of the soil modifier A comprises: step 1, uniformly mixing straw powder, rice bran and rapeseed cake, adding into the resulting mixture the EM stock solution and red sugar and then adding water to reach about 35% of a water content (by mass); and step 2, performing closed fermentation at a temperature of above 22° C. for 10-26 days. The preparation of the biological modifier B is as follows: mixing $Ca(NO_3)_2$, $KNO_3$, NaCl and KCl in a 5:3:1:1 ratio by mass, formulating 0.5 wt % of an inorganic salt solution from the resulting mixture of inorganic salts, and performing acclimation on seeds by gradually increasing the concentration using glucose as carbon source.

Further, after the step 2 above, the C/N ratio of the biological soil modifier A is adjusted to be 30-50 using straw powder.

Further, the C/N ratio of straw powder is 65-85:1, the C/N ratio of rice bran is 18-22:1, and the C/N ratio of rapeseed cake is 9-13:1.

The present invention also discloses a facility secondary $NO_3^-$ salinized soil modification method by applying the soil modifier A and the soil modifier B. The soil modifier A is applied by adding the soil modifier A into facility ploughing soil for planting, co-culturing at 35-50° C. for 5-7 days after being fully mixed, covering onto the soil surface 1 day before crop planting with a thickness of 0-10 cm. The soil modifier B is applied by diluting 500-1000× and then spraying onto the root surface during the crop growth period.

Further, the amount (by weight) of the soil modifier A is 1-1.4‰ of the soil weight.

Further, the amount of the soil modifier B after dilution is 3000-4500 kg/ha.

Beneficial Effects

In the present invention, a biological organic fertilizer having a higher C/N ratio is co-cultured with facility soil and then covered onto the soil surface, and also a composite microbial community is subjected to salt tolerance acclimation and then applied to soils. Microbial metabolism requires a carbon source and a nitrogen source and the organic fertilizer has an abundant C source. Therefore, microbial activity can sufficiently absorb excess nitrogen in soil and convert the nitrogen source into the microorganisms for temporary immobilization by assimilation, and the organic fertilizer improves the problem of pool soil structureness. Meanwhile, the facility soil has a high salt content, which inhibits the microbial growth. Therefore, by culture and acclimation, microbial adaptability and impact resistance to salinity are improved, which is an important precondition of salty soil treatment. The present invention particularly provides a salt tolerance acclimation method for the composite microbial community, so that the modifier can function well in the facility secondary salinized soil. In addition, the microorganisms in soil produce multiple amino acids such as glutamine and proline, multiple vitamins, and plant hormones such as cytokinins, auxins and gibberellins, during activity or after dying, which effectively facilitate crop growth and development.

The technical solutions described above employed in the present invention have the following advantages over the prior art:

1. The biological soil modifier of the present invention is subjected to salt tolerance acclimation, and after entering the soil, causes rapid formation of dominant populations, improves soil microbial flora, and increases soil microbial nitrogen content.

2. In the present invention, the biological organic fertilizer having a higher C/N ratio is co-cultured with the facility soil and then covered onto the soil surface, which improves soil structureness, increases soil permeability, facilitates salt rinsing and promotes effective utilization of excess nitrogen in soil by the microorganisms.

3. The present invention is useful to decrease the salt content in the facility secondary salinized soil, and improve the crop yield and quality. In addition, application of the composite microbial agent also increases nitrate reductase genes in crop leaves.

DETAILED DESCRIPTION OF THE PREFERRED EMBODIMENTS

The present invention is further described below with reference to specific examples. The examples are only used to illustrate the present invention and not limit the present invention.

The present invention is directed to a facility secondary salt salinized soil modification method by applying the soil modifier A and the soil modifier B. The use methods of the modifiers are also included. The soil modifier A comprises the following components by weight: 30-50 parts of straw powder, 10-40 parts of rice bran, 5-20 parts of rapeseed cake, and also an EM stock solution and red sugar. The weights of the EM stock solution and red sugar both are 1.2-4.5‰ of the total weight of straw powder, rice bran and rapeseed cake.

The preparation of the soil modifier A comprises the following steps:

Step 1, uniformly mixing straw powder, rice bran and rapeseed cake, adding into the resulting mixture the EM stock solution and red sugar and then adding water to reach about 35% of a water content; and Step 2, performing closed fermentation at a temperature of above 22° C. for 10-26 days.

After the preparation is completed, it is preferred to adjust the C/N ratio of the modifier. Preferably, the C/N ratio is adjusted to be 30-50 using straw powder, with $N+P_2O_5+K_2O \geq 5\%$.

In this embodiment, straw powder (C/N of 65-85:1), rice bran (C/N of 18-22:1), and rapeseed cake (C/N of 9-13:1) all are commercially available. A product having the C/N ratio of 30-50 is preferably prepared in this embodiment. The C/N is selected based on the following facts: essential nutrients and energy are required to maintain microbial vital activity and reproduction, and 1 part nitrogen generally needs to be consumed in order to absorb 25-30 parts carbon for microorganisms, and thus when an organic substance applied to soils has a C/N<25:1, microorganisms cannot utilize available nitrogen in soils and rather, relatively complete decomposition of the organic substance results in release of mineral nitrogen, so that nitrate nitrogen effect cannot be reduced; when the C/N ratio is too large, N element required for microbial cell proliferation is absent, which is unfavorable to microbial activity. Thus, the substance having a C/N ratio of 30-50 is co-cultured with the facility soil in the present invention, the ploughing soil can provide sufficient available carbon source for the modifier.

The preparation of the biological modifier B is as follows: step 1, mixing $Ca(NO_3)_2$, $KNO_3$, NaCl and KCl in a 5:3:1:1 ratio by mass, formulating 0.5 wt % of an inorganic salt solution from the resulting mixture of inorganic salts, with glucose as carbon source, seeding 1-2 mL of the EM stock solution to a 250 mL triangular flask containing 100 mL of the mixture of inorganic salts, and performing enrichment culture at 30° C. with stirring at 170 r/min (usually, the culture is completed within 5-12 days), wherein the concentration of $NO_3^-$ in culture is determined every 2 d, and when the cutting rate is 230% and the amount of seeds reaches $10^7$-$10^8$ cfu/ml, the next culture is performed; step 2, taking 1-2 mL of the solution obtained from the last culture and adding 100 mL 1.0 wt % of the inorganic salt solution (the concentration is increased at 0.5% gradient) and performing enrichment culture under the same conditions as those described above; next, the concentration of the inorganic salt solution is successively increased to 4% at 0.5% gradient.

The soil modifier A is solid and is used by co-culture with the ploughing soil before crop planting. The soil modifier B is liquid, is subjected to salt tolerance acclimation to have effective microbial populations as main component, and is sprayed onto the root surface during the crop growth period.

For the facility secondary $NO_3^-$ salinized soil modification method, the soil modifier A is applied by stacking the facility ploughing soil for planting having a thickness of about 0-10 cm of the surface layer to be 35-40 cm high. The soil modifier A is added at 1-1.4‰ by mass, fully mixed, co-cultured at 35-50° C. for 5-7 days, covered onto the soil surface layer to 0-10 cm 1 day before crop planting. The soil modifier B is applied by diluting 500-1000× and then spraying onto the root surface in an amount of 3000-4500 kg/ha during the crop growth period depending on the growth conditions. The soil has good drainage ability, or is provided with an underground drainage system. Taking tomato as an example, reasonable irrigation manner is drip irrigation or common irrigation. The upper irrigation limit is the field moisture capacity, the lower irrigation limit is 45% (seedling period)-65% (flowering and fruit setting period)-60% (fruiting period), and designed wetted layer is 0.2 m (seedling period)-0.4 m (flowering and fruit setting period and fruiting period).

The EM stock solution used in this embodiment is available from Love Harmony Music Environmental Biotechnology (Nanjing) Co., Ltd. It contains more than 80 effective active microorganisms such as photosynthetic bacteria, lactic acid bacteria, yeasts, has the live bacterial count ≥0.1 billion/ml at pH≥3.8, and is a tan, translucent liquid with thick sour or tart odor.

The facility agriculture is dryland farming, and substantial accumulation of nitrate nitrogen in the ploughing layer soil, particularly 0-10 cm soil, is a main cause of soil secondary salinization. The mechanisms by which the present invention decreases the soil $NO_3^-$ content are described as follows: a high concentration of nitrates has strong inhibition effect on microorganisms themselves, which affects microbial metabolism, and the microbial agent in the present method is subjected to salt tolerance acclimation, and after being applied to the crop root system, causes quick formation of beneficial microbial populations, accelerates assimilation on soil nitrates, and converts nitrogen element into microbial nitrogen, thereby reducing the content of soluble nitrogen element in soil; and meanwhile, the presence of denitrifying microorganisms accelerates the denitrifying process, $NO_3^-$ is reduced to release molecular nitrogen ($N_2$) or nitrous oxide ($N_2O$), leaving the soil.

Examples 1-4: Preparation of Soil Modifiers

For the soil modifier A of the present invention, the raw materials were mixed in different proportions, adjusted to a water content of about 35% (w/w), and charged into a lidded plastic tub for closed fermentation at above 22° C. for 10-26 days. When a fragrant odor was diffused, it was indicated that the fermentation was completed, and straw powder was used to adjust the C/N ratio to be 30-50. The composition of the raw materials is as follows:

| | Ex. No. | | | |
|---|---|---|---|---|
| Item | 1 | 2 | 3 | 4 |
| straw powder (kg) | 40 | 42 | 48 | 50 |
| rice bran (kg) | 36 | 33 | 24 | 20 |
| rapeseed cake (kg) | 24 | 25 | 28 | 30 |
| EM stock solution (kg) | 0.12 | 0.27 | 0.30 | 0.45 |
| red sugur (kg) | 0.12 | 0.27 | 0.30 | 0.45 |
| days | 10 | 15 | 20 | 26 |
| $N + P_2O_5 + K_2O$ (%) | 5.53 | 5.31 | 5.3 | 5 |

The preparation of the soil modifier B comprises the following steps:

Step 1, mixing $Ca(NO_3)_2$, $KNO_3$, NaCl and KCl in a 5:3:1:1 ratio by mass, formulating 0.5 wt % of an inorganic salt solution from the resulting mixture of inorganic salts, with glucose as carbon source, seeding 1-2 mL of the EM stock solution to a 250 mL triangular flask containing 100 mL of the mixture of inorganic salts, and performing enrichment culture at 30° C. with stirring at 170 r/min, wherein the concentration of $NO_3^-$ in culture was determined every 2 d, and when the cutting rate of $NO_3^-$ was ≥30% and the amount of seeds reached $10^7$-$10^8$ cfu/ml, the next culture was performed; step 2, taking 1-2 mL of the solution obtained from the last culture and adding 100 mL 1.0 wt % of the inorganic salt solution and performing enrichment culture under the same conditions as those described above, wherein the concentration of the inorganic salt solution was successively increased to 4% at 0.5% gradient.

Examples 1-4 were formulated with the same batch of the soil modifier B and were subjected to soil planting and modification tests described below.

Example 5

The resulting soil modifiers from example 1 were selected for tomato planting on various types of soils.

Soil 1 was normal facility soil without soil secondary salt salinization.

Soil 2 was soil with mild-to-moderate facility secondary salt salinization having a total salt content of 2.10 g/kg, soil nitrate nitrogen of 0.44 g/kg and pH 6.1.

Soil 3 was soil modified from soil 2 using the soil modifiers in example 1. The modification was performed by stacking the facility ploughing soil for planting (0-10 cm) to be 35-40 cm high, adding the soil modifier A at 1‰ by mass, fully mixing, co-culturing at 35-50° C. for 5-7 days, covering onto the soil surface layer to 0-10 cm 1 day before crop planting, planting tomato seedlings, and 7 days later, spraying the soil modifier B diluted 500× (3000 kg/ha) onto the root system; afterwards, the soil modifier B was sprayed once during flowering period and during fruit expanding period.

The soils were provided with an underground drainage system (depth of drainage pipe of 0.7 m, spacing of 8 m). The facility tomato irrigation manner was drip irrigation, and the upper irrigation limit was the field moisture capacity and the lower irrigation limit was 45% (seedling period)-65% (flowering and fruit setting period)-60%/o (fruiting period), and the designed wetted layer was 0.2 m (seedling period)-0.4 m (flowering and fruit setting period and fruiting period).

The results indicated that for one season of tomato planting, the present modification method resulted in decrease of total salt content in soils (0-15 cm) by 37% and increase of tomato yield by 33%.

Specific soil types and test results are shown in table 1 below:

TABLE 1

| Treatment | Soil total salt content/g kg$^{-1}$ | Soil nitrate nitrogen/g kg$^{-1}$ | Fruit nitrates/g kg$^{-1}$ | Relative quantity of leaf nitrate reductase genes (HQ616893) | Tomato yield/t ha$^{-1}$ |
|---|---|---|---|---|---|
| Soil 1 | 0.06 | 0.015 | 0.10 | 0.81 | 80.1 |
| Soil 2 | 2.10 | 0.440 | 0.12 | 1.34 | 63.8 |
| Soil 3 | 1.32 | 0.172 | 0.074 | 6.07 | 84.9 |

It can be seen from the table that, after being soil modified, soil 3 produces a tomato yield significantly higher than that of non-modified soil 2 and better than that of normal soil.

Example 6

Similar to example 5, the resulting soil modifiers from example 1 were selected for tomato planting on various types of soils.

Soil 1 was normal facility soil without soil secondary salt salinization.

Soil 2 was soil with serious facility secondary salt salinization having a total salt content of 3.90 g/kg, soil nitrate nitrogen of 1.35 g/kg and pH 5.7.

Soil 3 was soil modified from soil 2 using the soil modifiers in example 1. The modification was performed by stacking the facility ploughing soil for planting (0-10 cm) to be 35-40 cm high, adding the soil modifier A at 1.4‰ by mass, fully mixing, co-culturing at 35-50° C. for 5-7 days, covering onto the soil surface layer to 0-10 cm 1 day before crop planting, planting tomato seedlings, and 7 days later, spraying the soil modifier B diluted 1000× (4500 kg/ha) onto the root system; afterwards, the soil modifier B was sprayed once every 10 days.

The soils were provided with an underground drainage system (depth of drainage pipe of 0.7 m, spacing of 8 m). The facility tomato irrigation manner was drip irrigation, and the upper irrigation limit was the field moisture capacity and the lower irrigation limit was 45% (seedling period)-65% (flowering and fruit setting period)-60% (fruiting period), and the designed wetted layer was 0.2 m (seedling period)-0.4 m (flowering and fruit setting period and fruiting period).

The results indicated that for one season of tomato planting, the present modification method resulted in decrease of total salt content in soils (0-15 cm) by 45% and increase of tomato yield by 73%.

Specific soil types and test results are shown in table 2 below:

TABLE 2

| Treatment | Soil total salt content/g kg$^{-1}$ | Soil nitrate nitrogen/g kg$^{-1}$ | Fruit nitrates/g kg$^{-1}$ | Relative quantity of leaf nitrate reductase genes (HQ616893) | Tomato yield/t ha$^{-1}$ |
|---|---|---|---|---|---|
| Soil 1 | 0.06 | 0.015 | 0.10 | 0.81 | 80.1 |
| Soil 2 | 3.90 | 1.350 | 0.12 | 1.34 | 43.2 |
| Soil 3 | 2.13 | 0.389 | 0.074 | 6.07 | 74.9 |

It can be seen from the table that, after being soil modified, soil 3 produces a tomato yield significantly higher than that of non-modified soil 2.

Comparative Example 1

The resulting soil modifiers from example 1 were selected for tomato planting on various types of soils. The difference from example 5 was that the biological modifier B was not used in the soil modification process.

Soil 1 was normal facility soil without soil secondary salt salinization.

Soil 2 was soil with mild-to-moderate facility secondary salt salinization having a total salt content of 2.10 g/kg, soil nitrate nitrogen of 0.44 g/kg and pH 6.1.

Soil 3 was soil modified from soil 2 using the soil modifier in example 1. The modification was performed by stacking the facility ploughing soil for planting (0-10 cm) to be 35-40 cm high, adding the soil modifier A at 1‰ by mass, fully mixing, co-culturing at 35-50° C. for 5-7 days, covering onto the soil surface layer to 0-10 cm 1 day before crop planting, and planting tomato seedlings.

Soil 4 was soil modified from soil 2 using the biological modifier A (in the preparation, the C/N ratio was adjusted to be 80) and applied by the same procedure as soil 3.

Soil 5 was soil modified from soil 2 using the biological modifier A (in the preparation, the C/N ratio was adjusted to be 12) and applied by the same procedure as soil 3.

The soils were provided with an underground drainage system (depth of drainage pipe of 0.7 m, spacing of 8 m). The facility tomato irrigation manner was drip irrigation, and the upper irrigation limit was the field moisture capacity and the lower irrigation limit was 45% (seedling period)-65% (flowering and fruit setting period)-60% (fruiting period), and the designed wetted layer was 0.2 m (seedling period)-0.4 m (flowering and fruit setting period and fruiting period).

The results indicated that for one season of tomato planting, the biological modifier A, the modifier with high C/N and the modifier with low C/N resulted in decrease of total salt content in soils (0-15 cm) by 12%, 16% and −9% and increase of tomato yield by 13%, 5% and −6%, respectively.

Specific soil types and test results are shown in table 3 below:

TABLE 3

| Treatment | Soil total salt content/g kg$^{-1}$ | Soil nitrate nitrogen/g kg$^{-1}$ | Fruit nitrates/ g kg$^{-1}$ | Relative quantity of leaf nitrate reductase genes (HQ616893) | Tomato yield/t ha$^{-1}$ |
|---|---|---|---|---|---|
| Soil 1 | 0.06 | 0.015 | 0.10 | 0.81 | 80.1 |
| Soil 2 | 2.10 | 0.440 | 0.12 | 1.34 | 63.8 |
| Soil 3 | 1.85 | 0.343 | 0.10 | 3.68 | 72.3 |
| Soil 4 | 1.81 | 0.218 | 0.08 | 3.49 | 67.2 |
| Soil 5 | 2.28 | 0.491 | 0.14 | 1.32 | 60.1 |

It can be seen from the table that, after being soil modified, soil 3 produces a tomato yield superior to non-modified soil 2, but slightly inferior to example 5 because no synergistic effect with the biological modifier B occurs; and that the modification effect of soil 4 is slightly superior to soil 3, but the tomato yield increasing amplitude is relatively low; and that soil 5 further aggravates the degree of facility soil secondary salt salinization.

Comparative Example 2

The difference between comparative example 2 and example 5 was that the modifier B was the EM stock solution without salt tolerance acclimation, for tomato planting on various types of soils.

Soil 1 was normal facility soil without soil secondary salt salinization.

Soil 2 was soil with mild-to-moderate facility secondary salt salinization having a total salt content of 2.10 g/kg, soil nitrate nitrogen of 0.44 g/kg and pH 6.1.

Soil 3 was soil modified from soil 2 using the soil modifiers in example 1. The modification was performed by stacking the facility ploughing soil for planting (0-10 cm) to be 35-40 cm high, adding the soil modifier A at 1‰ by mass, fully mixing, co-culturing at 35-50° C. for 5-7 days, covering onto the soil surface layer to 0-10 cm 1 day before crop planting, planting tomato seedlings, and 7 days later, spraying the soil modifier B diluted 500× (3000 kg/ha) onto the root system; afterwards, the soil modifier B was sprayed once during flowering period and during fruit expanding period.

The soils were provided with an underground drainage system (depth of drainage pipe of 0.7 m, spacing of 8 m). The facility tomato irrigation manner was drip irrigation, and the upper irrigation limit was the field moisture capacity and the lower irrigation limit was 45% (seedling period)-65% (flowering and fruit setting period)-60% (fruiting period), and the designed wetted layer was 0.2 m (seedling period)-0.4 m (flowering and fruit setting period and fruiting period).

The results indicated that for one season of tomato planting, the present modification method resulted in decrease of total salt content in soils (0-15 cm) by 20% and increase of tomato yield by 12%.

Specific soil types and test results are shown in table 4 below:

TABLE 4

| Treatment | Soil total salt content/ g kg$^{-1}$ | Soil nitrate nitrogen/ g kg$^{-1}$ | Fruit nitrates/ g kg$^{-1}$ | Relative quantity of leaf nitrate reductase genes (HQ616893) | Tomato yield/t ha$^{-1}$ |
|---|---|---|---|---|---|
| Soil 1 | 0.06 | 0.015 | 0.10 | 0.81 | 80.1 |
| Soil 2 | 2.10 | 0.440 | 0.12 | 1.34 | 63.8 |
| Soil 3 | 1.67 | 0.290 | 0.011 | 3.82 | 71.2 |

It can be seen from the table that, when the EM stock solution is not subjected to acclimation, its effect on reduction of total salt content in soils and increase of tomato yield is slightly inferior to that of the soil modifier in example 5.

What is claimed is:

1. A facility secondary $NO_3^-$ salinized soil modifier, comprising a soil modifier A and a soil modifier B, wherein the soil modifier A comprises the following components by weight: 30-50 parts of straw powder, 10-40 parts of rice bran, 5-20 parts of rapeseed cake, and also an EM stock solution and red sugar, and the weights of the EM stock solution and the red sugar both are 1.2-4.5% of the total weight of the straw powder, the rice bran and the rapeseed cake; and the soil modifier B is obtained by acclimation of the EM stock solution by gradually increasing a salt solution concentration, wherein the C/N ratio of the straw powder is 65-85:1, the C/N ratio of the rice bran is 18-22:1, and the C/N ratio of the rapeseed cake is 9-13:1.

2. A method of preparing the facility secondary $NO_3^-$ salinized soil modifier of claim 1, comprising:
   preparing the soil modifier A, which comprises the steps of uniformly mixing the straw powder, the rice bran, and the rapeseed cake, adding the EM stock solution and the red sugar into the resulting mixture and then adding water to reach about 35% of a water content (by mass); and performing closed fermentation at a temperature of above 22° C. for 10-26 days; and
   preparing the soil modifier B, which comprises the steps of: mixing $Ca(NO_3)_2$, $KNO_3$, NaCl and KCl in a 5:3:1:1 ratio by mass, formulating 0.5 wt % of an inorganic salt solution from the resulting mixture of inorganic salts, and performing acclimation by gradually increasing the concentration, wherein a concentration of an inorganic salt is successively increased to 4% by 0.5% gradient, and wherein the C/N ratio of the straw powder is 65-85:1, the C/N ratio of the rice bran is 18-22:1, and the C/N ratio of the rapeseed cake is 9-13:1.

3. The method of claim 2 wherein after the last step, the C/N ratio of the biological soil modifier A is adjusted to be 30-50 using the straw powder.

4. A soil modification method based on the facility secondary $NO_3^-$ salinized soil modifier according to claim 1, by comprising:
- applying the soil modifier A by adding the soil modifier A into a facility ploughing soil for planting;
- co-culturing at 35-50° C. for 5-7 days after being fully mixed;
- covering onto the soil surface 1 day before crop planting with a thickness of 0-10 cm;
- applying the soil modifier B by diluting 500-1000× and spraying onto the root surface during the crop growth period.

5. The soil modification method based on the facility secondary $NO_3^-$ salinized soil modifier according to claim 4, wherein the amount of the soil modifier A is 1-1.4‰ of the soil weight.

6. The soil modification method based on the facility secondary $NO_3^-$ salinized soil modifier according to claim 4, wherein the amount of the soil modifier B after dilution is 3000-4500 kg/ha.

* * * * *